(12) United States Patent
Zhu et al.

(10) Patent No.: US 10,051,509 B2
(45) Date of Patent: Aug. 14, 2018

(54) REFERENCE SIGNAL GENERATION AND DETERMINING REFERENCE SIGNAL RESOURCE ALLOCATION

(75) Inventors: Yuan Zhu, Beijing (CN); Alexei Davydov, Nizhny Novgorod (RU); Xiaogang Chen, Beijing (CN); Huaning Niu, Milpitas, CA (US); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/519,312

(22) PCT Filed: Dec. 9, 2011

(86) PCT No.: PCT/US2011/064195
§ 371 (c)(1),
(2), (4) Date: Jun. 26, 2012

(87) PCT Pub. No.: WO2012/148475
PCT Pub. Date: Nov. 1, 2012

(65) Prior Publication Data
US 2015/0139079 A1    May 21, 2015

Related U.S. Application Data

(60) Provisional application No. 61/481,024, filed on Apr. 29, 2011.

(51) Int. Cl.
*H04W 28/02* (2009.01)
*H04N 21/2365* (2011.01)
(Continued)

(52) U.S. Cl.
CPC ...... *H04W 28/0231* (2013.01); *H04B 7/0413* (2013.01); *H04B 7/0417* (2013.01);
(Continued)

(58) Field of Classification Search
CPC ............... H04W 72/1294; H04W 72/12; H04J 11/0069; H04J 11/005; H04J 11/003;
(Continued)

(56) References Cited

U.S. PATENT DOCUMENTS

2010/0232384 A1    9/2010   Farajidana et al.
2011/0038310 A1 *  2/2011   Chmiel ................ H04J 11/0069
                                                    370/328
(Continued)

FOREIGN PATENT DOCUMENTS

CN          101682419 A      3/2010
CN          102742208 A     10/2012
(Continued)

OTHER PUBLICATIONS

TS 36.211 V10.1.0, Physical Channels and Modulation (Release 10), Mar. 2011.*
(Continued)

*Primary Examiner* — Oussama Roudani
(74) *Attorney, Agent, or Firm* — Schwabe, Williamson & Wyatt, P.C.

(57) ABSTRACT

Various embodiments include devices, methods, computer-readable media and system configurations for reference signal generation and resource allocation. In various embodiments, a wireless communication device may include a control module, which may be operated by a processor and configured to transmit to a user equipment ("UE") device, over a wireless communication interface, a parameter specific to the UE device; wherein the parameter is usable by the eNB to generate a user equipment-specific reference signal ("UE-RS") to be sent to the UE device. The parameter may be usable by the UE device to identify the UE-RS to facilitate demodulation of multiple-input, multiple-output communications. In various embodiments, a (Continued)

control module may be configured to store, in memory, priority rules, and to determine a UE-RS resource allocated to another UE device based on a UE-RS resource allocated to the UE device and the priority rules.

12 Claims, 3 Drawing Sheets

(51) Int. Cl.
| | | |
|---|---|---|
| H04N 21/643 | (2011.01) | |
| H04W 52/02 | (2009.01) | |
| H04B 7/0456 | (2017.01) | |
| H04W 72/04 | (2009.01) | |
| H04W 48/06 | (2009.01) | |
| H04L 12/803 | (2013.01) | |
| H04L 12/801 | (2013.01) | |
| H04L 29/06 | (2006.01) | |
| H04L 1/18 | (2006.01) | |
| H04L 5/00 | (2006.01) | |
| H04J 11/00 | (2006.01) | |
| H04L 27/26 | (2006.01) | |
| H04L 1/00 | (2006.01) | |
| H04B 7/0413 | (2017.01) | |
| H04B 7/0417 | (2017.01) | |
| H04W 68/00 | (2009.01) | |
| H04B 7/0452 | (2017.01) | |
| H04W 72/12 | (2009.01) | |
| H04W 12/06 | (2009.01) | |
| H04W 12/08 | (2009.01) | |
| H04W 88/02 | (2009.01) | |
| H04W 4/70 | (2018.01) | |
| H04W 88/06 | (2009.01) | |
| H04W 36/14 | (2009.01) | |
| H04B 7/06 | (2006.01) | |
| H04W 84/12 | (2009.01) | |
| H04W 88/10 | (2009.01) | |

(52) U.S. Cl.
CPC ......... *H04B 7/0452* (2013.01); *H04B 7/0482* (2013.01); *H04B 7/0486* (2013.01); *H04J 11/0046* (2013.01); *H04L 1/0032* (2013.01); *H04L 1/1812* (2013.01); *H04L 1/1861* (2013.01); *H04L 5/0025* (2013.01); *H04L 5/0026* (2013.01); *H04L 5/0035* (2013.01); *H04L 5/0048* (2013.01); *H04L 5/0051* (2013.01); *H04L 5/0053* (2013.01); *H04L 5/0055* (2013.01); *H04L 5/0057* (2013.01); *H04L 5/0092* (2013.01); *H04L 5/0094* (2013.01); *H04L 27/2602* (2013.01); *H04L 27/2613* (2013.01); *H04L 47/125* (2013.01); *H04L 47/14* (2013.01); *H04L 63/10* (2013.01); *H04L 65/4076* (2013.01); *H04N 21/2365* (2013.01); *H04N 21/64322* (2013.01); *H04W 4/70* (2018.02); *H04W 12/06* (2013.01); *H04W 12/08* (2013.01); *H04W 28/0268* (2013.01); *H04W 48/06* (2013.01); *H04W 52/0203* (2013.01); *H04W 52/0219* (2013.01); *H04W 68/005* (2013.01); *H04W 72/042* (2013.01); *H04W 72/0406* (2013.01); *H04W 72/0413* (2013.01); *H04W 72/1247* (2013.01); *H04W 88/02* (2013.01); *H04B 7/0465* (2013.01); *H04B 7/0478* (2013.01); *H04B 7/0632* (2013.01); *H04W 36/14* (2013.01); *H04W 84/12* (2013.01); *H04W 88/06* (2013.01); *H04W 88/10* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/21* (2018.01); *Y02D 70/26* (2018.01); *Y02D 70/444* (2018.01)

(58) Field of Classification Search
CPC ....... H04J 13/10; H04J 13/16; H04L 27/2613; H04L 5/0023; H04L 5/0051
See application file for complete search history.

(56) References Cited

U.S. PATENT DOCUMENTS

| | | | |
|---|---|---|---|
| 2011/0085503 A1* | 4/2011 | Nam et al. | 370/329 |
| 2011/0103324 A1* | 5/2011 | Nam et al. | 370/329 |
| 2011/0249767 A1* | 10/2011 | Chen et al. | 375/295 |
| 2012/0176939 A1* | 7/2012 | Qu et al. | 370/255 |

FOREIGN PATENT DOCUMENTS

| | | |
|---|---|---|
| JP | 2012231218 A | 11/2012 |
| WO | WO 2010/105229 A1 | 9/2010 |
| WO | 2011/047351 A2 | 4/2011 |
| WO | 2011/083068 A1 | 7/2011 |

OTHER PUBLICATIONS

International Search Report dated May 24, 2012, from International Application No. PCT/US2011/064195.
Samsung, "Scrambling sequence for MU-MIMO," 3GPP TSG-RAN WG1 #59bis, R1-100124, Jan. 18-22, 2010, 3 pages.
3GPP, Lte Advanced, "Evolved Universal Terrestrial Radio Access (E-UTRA); Physical channels and modulation (3GPP TS 36.211 version 10.1.0 Release 10)," ETSI TS 136 211 V10.1.0 (Apr. 2011), 105 pages.
Nokia, Nokia Siemens Networks, "On advanced UE MMSE receiver modelling in system simulations," Agenda 6.3.1.3, 3GPP TSG RAN WG1 Meeting #64, R1-111031, Taipei Taiwan, Feb. 21-25, 2011, 10 pages.
LG Electronics et al., "Proposal for UE receiver assumption in CoMP simulations," TSG-RAN WG1 #63bis, R1-110576, Agenda Item: 6.3.1.1, Dublin, Ireland, Jan. 17-21, 2011, 5 pages.
Office Action dated Aug. 5, 2014 from Japanese Patent Application No. 2014-508337.
Samsung, "Further discussions on DL control signalling for MU-MIMO," 3GPP TSG RAN WG1 #62bis, R1-105387, Agenda Item: 6.3.3, Oct. 11-15, 2010, Xi'an, China, 4 pages.
Texas Instruments, "Discussion on DMRS for DL CoMP," 3GPP TSG RAN WG1 Meeting #67, R1-113785, Agenda Item: 7.5.21.1, Nov. 14-18, 2011, San Francisco, CA, USA, 2 pages.
Office Action dated Mar. 2, 2015 from Korean Application No. 10-2013-7028626.
Search Report dated Feb. 4, 2015 from European Application No. 11864289.1.
Panasonic, "DMRS port indicaiton with MU-MIMO considerations," 3GPP TSG RAN WG1 Meeting #60 R1-101264, Agenda Item: 7.2.3.2. Use of DM RS ports / scrambling sequences for MU-MIMO, Feb. 22-26, 2010, San Francisco, CA, USA, 5 pages.
Huawei, "Considerations on DMRS sequence design," 3GPP TSG RAN WG1 meeting #58bis, R1-094342, Agenda Item: 6.4.4, Oct. 12-16, 2009, Miyazaki, Japan, 5 pages.
Huawei et al., "Enhancements of DL DMRS for CoMP," 3GPP TSG RAN WG1 Meeting #67, R1-113641, Agenda Item: 7.5.2.1.1, Nov. 14-18, 2011, San Francisco, CA, USA, 4 pages.

(56) References Cited

OTHER PUBLICATIONS

Samsung, "DMRS Scrambling for Downlink CoMP," 3GPP TSG RAN WG1 #67, R1-114226, Agenda Item: 7.5.2.1.1, Nov. 14-18, 2011, San Francisco, CA, USA, 4 pages.
Extended European Search Report dated May 20, 2015 for European Application No. 11864289.1, 17 pages.
Panasonic: "DMRS port indication with MU-MIMO considerations", 3GPP Draft; R1-101264, 3rd Generation Partnership Project (3GPP), Mobile Comptence Cetner; 650, Route Des Lucioles; F-06921 Sophia-Antiplis Cedex; France, vol. RAN WG1, No. San Francisco, USA; Feb. 22-26, 2010; 5 pages.
Huawei: "Consideration on DMRS sequence design", 3GPP Draft; R1-094342, 3rd Generation Partnership Project (3GPP), Mobile Comptence Cetner; 650, Route Des Lucioles; F-06921 Sophia-Antiplis Cedex; France, No. Miyazaki, Japan, Oct. 12-16, 2009, 5 pages.
Huawei et al: "Enhancements of DL DMRS for CoMP", 3GPP Draft; R1-113641, 3rd Generation Partnership Project (3GPP), Mobile Comptence Cetner; 650, Route Des Lucioles; F-06921 Sophia-Antiplis Cedex; France, vol. RAN WG1, No. San Francisco, USA; Nov. 14-18, 2011, 4 pages.
Samsung: "DMRS Scrambling for Downlink CoMP", 3GPP Draft; R1-114226 DRMS Scrambling, 3rd Generation Partnership Project (3GPP), Mobile Comptence Cetner; 650, Route Des Lucioles; F-06921 Sophia-Antiplis Cedex; France, vol. RAN WG1, No. San Francisco, USA, Nov. 14-18, 2011, 4 pages.
Texas Instruments: "Discussion on DMRS for DL CoMP", 3GPP Draft; R1-113785_TI_COMP_DMRS_V2, 3rd Generation Partnership Project (3GPP), Mobile Comptence Cetner; 650, Route Des Lucioles; F-06921 Sophia-Antiplis Cedex; France, vol. RAN WG1, No. San Francisco, USA, Nov. 14-18, 2011, 2 pages.
Pantech: "DMRS Indicator of DL signalling for Non-transparent MU-MIMO", 3GPP Draft; R1-103614, 3rd Generation Partnership Project (3GPP), Mobile Comptence Cetner; 650, Route Des Lucioles; F-06921 Sophia-Antiplis Cedex; France, vol. RAN WG1, No. Dresden, Germany, Jun. 28-Jul. 2, 2010; 4 pages.
CMCC: "Some considerations of the MU-MIMO in Dual-layer beamforming in LTE R9", 3GPP Draft; R1-092825 Some Consideration on MU-MIMO in Dual-Layering Beamforming in LTE R9, 3rd Generation Partnership in Project (3GPP), Mobile Comptence Centre; 650, Route Des Lucioles; F-06921 Sophia-Antiplis Cedex; France, vol. RAN WG1, No. Los Angeles, US; Jun. 29-Jul. 3, 2009, 3 pages.
Office Action dated Sep. 28, 2015 from Chinese Patent Application No. 201180070492.6, 17 pages.
Office Action dated Apr. 1, 2016 from Korean Divisional Application No. 10-2015-7014609, 9 pages.
3GPP, "Technical Specification Group Radio Access Network; Evolved Universal Terrestrial Radio Access (E-UTRA); Physical Channels and Modulation (Release 10)," 3GPP TS 36.211 V10.1.0 (Mar. 2011), LTE Advanced, 103 pages.
LG Electronics, "Uplink reference signals for CoMP," 3GPP TSG RAN WG1 Meeting #66bis, R1-113280, Agenda item: 7.5.4.2, 10th- 14th, 2011, Zhuhai, China, 2 pages.
Intel Corporation, "UL CoMP DM-RS Enhancements for Heterogeneous Networks," 3GPP TSG-RAN WG1 Meeting #67, R1-113665, Agenda Item: 7.5.4.1, Nov. 14th-18th, 2011, San Francisco, California, 8 pages.
3GPP, "RAN1 Chairman's Notes," 3GPP TSG RAN WG1 Meeting #66bis, Oct. 10-14, 2011, Zhuhai, China, 34 pages.
MCC Support, "Final Report of 3GPP TSG RAN WG1 #66bis v1.1.0," (Zhuhai, P.R. China, Oct. 10-14, 2011 ), 3GPP TSG RAN WG1 Meeting #67, R1-114352, Nov. 14-18, 2011, San Francisco, California, 84 pages.
LG Electronics, "Uplink reference signals for CoMP," 3GPP TSG RAN WG1 Meeting #66bis R1-113498, Agenda Item: 7.5.4.2, Oct. 10-14, 2011, Zhuhai, China, 5 pages.
Qualcomm Incorporated, "DM-RS configuration in support of downlink CoMP," 3GPP TSG-RAN WG1 #67, R1-114112, Nov. 14-18, 2011, San Francisco, USA, 4 pages.

CATT, "Considerations on UE-specific DM-RS configuration," 3GPP TSG RAN WG1 Meeting #67, R1-113732, Agenda Item: 7.5.2.1.1, Nov. 14-18, 2011, San Francisco, 3 pages.
ZTE, "Uplink Reference Signal Enhancement for CoMP," 3GPP TSG-RAN WG1 #66bis, R1-113017, Oct. 10-14, 2011, Zhuhai, China, 5 pages.
Panasonic, "DMRS Enhancement for UL CoMP," 3GPP TSG-RAN WG1 Meeting #67, R1-113810, Nov. 14-18, 2011, San Francisco, USA, 6 pages.
Second Office Action dated May 10, 2016 from Chinese Patent Application No. 201180070492.6, 10 pages.
PANTECH, "Multiple CSI-RS Resource Configuration for CoMP", R1-113831, 3GPP TSG-RAN WG1 Meeting #67, San Francisco, USA, Nov. 14-18, 2011.
Sharp, "CSI-RS configuration of UL transmission", R1-113823, 3GPP TSG-RAN WG1 Meeting #67, San Francisco, USA, Nov. 14-18, 2011.
Ericsson et al. "Potential Enhancements for UL DMRS", R1-114253, 3GPP TSG-RAN WG1 Meeting #67, San Francisco, USA, Nov. 14-18, 2011.
Huawei et al., "Enhancements of SRS for UL CoMP", R1-113647, 3GPP TSG-RAN WG1 Meeting #67, San Francisco, USA, Nov. 14-18, 2011.
Alcatel-Lucent et al., On the need of SRS Enhancement of UL CoMP, R1-114052, 3GPP TSG-RAN WG1 Meeting #67, San Francisco, USA, Nov. 14-18, 2011.
LG Electronics, PUCCH resource management for UL CoMP, R1-113990, 3GPP TSG-RAN WG1 Meeting #67, San Francisco, USA, Nov. 14-18, 2011.
LG R1-113987, 'DM RS enhancements for UL CoMP', 3GPP TSG RAN WG1 Meeting #67, Nov. 14-18, 2011, pp. 1-5.
LG R1-113498, 'Uplink reference signals for CoMP', 3GPP TSG RAN WG1 Meeting #66bis, Nov. 10-14, 2011, pp. 1-5 (cited by R1-113987).
NTT DOCOMO et al., "UL RS Enhancement for LTE-Advanced," 3GPP TSG RAN WG1 Meeting #59, R1-094911 (Original R1-092801), Agenda Item: 7.4.1, Nov. 9-13, 2009, Jeju, Korea, 6 pages.
Ericsson et al., "Potential Enhancements for DMRS in Rel-11 ," 3GPP TSG RAN WG1 Meeting #66, R1-112086, Agenda Item: 6.7.1, Aug. 22-26, 2011, Athens, Greece, 6 pages.
Intel Corporation, "Discussion on uplink DM-RS enhancements for Release 11 ," 3GPP TSG-RAN WG1 #66, R1-112233, Agenda Item: 6.7.1, Aug. 22-26, 2011, Athens, Greece, 2 pages.
Panasonic, "Uplink enhancement for Rel.11 ," 3GPP TSG-RAN WG1 Meeting #66, R1-112367, Agenda Item: 6.7, Aug. 22-26, 2011, Athens, Greece, 4 pages.
Intel Corporation, "Views on standardization impact of UL CoMP," 3GPP TSG-RAN WG1 Meeting #66bis, R1-113208, Agenda Item: 7.5.4.1, Oct. 10-14, 2011, Zhuhai, China, 2 pages.
Office Action dated Jul. 10, 2016 from Korean Divisional Patent Application No. 10-2015-7014609, 6 pages.
Office Action dated Aug. 9, 2016 from Japanese Divisional Application No. 2015-166214, 5 pages.
Samsung, "Scrambling sequence for CoMP," 3GPP TSG RAN WG1 meeting #60, R1-101178, Agenda Item: 7.2.5, Feb. 22-26, 2010, San Francisco, USA, 4 pages.
NTT DOCOMO et al., "Downlink DM-RS Design for LTE-Advanced," 3GPP TSG RAN WG1 Meeting #58bis, R1-094338, Agenda Item: 7.3.1, Oct. 12-16, 2009, Miyazaki, Japan, 6 pages.
Orange, Telefonica, "Backhaul modelling for CoMP," TSG-RAN WG1 #64, R1-111174, Agenda Item: 6.3.1.4, Feb. 21-25, 2011, Taipei, Taiwan, 5 pages.
Notice of Preliminary Rejection dated Jul. 11, 2017 from Korean Divisional Application No. 10-2017-7016901, 9 pageS.
Office Action dated Oct. 21, 2016 from Chinese Patent Application No. 201180070492.6, 4 pages.
Office Action dated Jan. 2, 2017 from Second Korean Divisional Application No. 10-2016-7028085, 8 pages.
Office Action dated May 10, 2016 in Chinese Patent Application No. 201180070492.6, 7 pages.

(56) References Cited

OTHER PUBLICATIONS

Notice of Final Rejection dated Mar. 22, 2017 from Korean Divisional Application No. 10-2016-7028085, 8 pages.

* cited by examiner

REFERENCE SIGNAL GENERATION AND DETERMINING REFERENCE SIGNAL RESOURCE ALLOCATION

CROSS REFERENCE TO RELATED APPLICATIONS

The present application is a national phase entry under 35 U.S.C. § 371 of International Application No. PCT/US2011/64195, filed Dec. 9, 2011, entitled "REFERENCE SIGNAL GENERATION AND DETERMINING REFERENCE SIGNAL RESOURCE ALLOCATION," which designates the United States of America, and which claims priority to U.S. Provisional Patent Application No. 61/481,024, filed Apr. 29, 2011, the entire contents and disclosures of which are hereby incorporated by reference in their entireties.

FIELD

Embodiments of the present invention relate generally to the field of wireless transmission, and more particularly, to reference signal generation and reference signal resource allocation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In 3GPP Long Term Evolution ("LTE") Release 10 (March 2011) (the "LTE Standard"), a user equipment ("UE")-specific reference signal ("UE-RS") may support up to eight transmission layers using two code division-multiplexing ("CDM") groups. One of the CDM groups may utilize the following set of UE-RS antenna ports: {7, 8, 11, 13}. The other CDM group may utilize the following set of UE-RS antenna ports: {9, 10, 12, 14}.

Pseudo-random sequences generated for UE devices in an LTE cell may be specific to that cell, or "cell-specific." This generation may involve two possible scrambling code identities ("SCIDs"). In embodiments where multiple user-multi in, multi out ("MU-MIMO") transmission is implemented, there may be up to four composite layers utilized to transmit data. Each UE device may have either one or two composite layers. However, MU-MIMO transmissions may be transparent to a given UE device. For example, the existence of co-scheduled UE devices may not be indicated through signaling, and mitigation of interference from co-scheduled UE devices may be limited.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
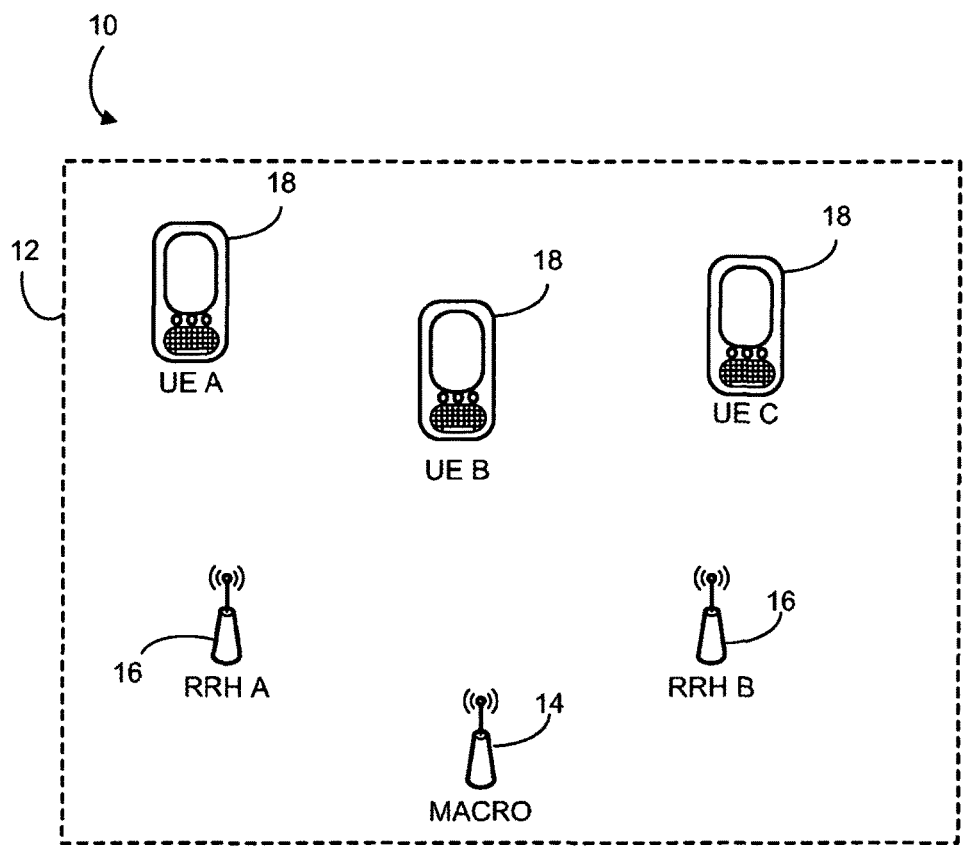
FIG. 1 illustrates an example wireless communication network, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. As used herein, "computer-implemented method" may refer to any method executed by one or more processors, a computer system having one or more processors, a mobile device such as a smart phone (which may include one or more processors), a tablet, laptop computer, a set-top box, a gaming console, and so forth.

In various embodiments, a wireless communication device may include a processor, a wireless communication interface, a memory coupled to the processor, and a control module to be operated by the processor. The control module may be configured to transmit to a user equipment ("UE") device, over a wireless communication interface, a parameter specific to the UE device; wherein the parameter is usable by an evolved Node B ("eNB") to generate a user equipment-specific reference signal ("UE-RS") to be sent to the UE device. The parameter may be usable by the UE device to identify the UE-RS to facilitate demodulation of multiple-input, multiple-output communications. In various embodiments, a control module may be operated by a processor and configured to store, in memory, priority rules, and to determine a UE-RS resource allocated to another UE device based on a UE-RS resource allocated to the UE device and the priority rules. Methods, systems and computer-readable media may be provided for performing similar operations.

Referring now to FIG. 1, a wireless communication system 10 includes, in a single cell 12, a macro eNB 14 and two remote radio heads ("RRH") 16: RRH A and RRH B. Within cell 12, three user equipment ("UE") devices 18, UE A, UE B and UE C, may be connected to wireless communication network 10.

Macro eNB 14 may transmit a rank-two physical downlink shared channel ("PDSCH") to UE A. This transmission may include an indication that UE A is allocated UE-specific reference signal ("UE-RS") antenna ports 7 and 8, as well as scrambling code identity ("SCID") 0. RRH A may transmit rank two PDSCH to UE B. This transmission may include an indication that UE B is allocated UE-RS antenna ports 7 and 8, as well as SCID 1.

However, if RRH B attempts to transmit a rank-one PDSCH to UE C, all possible rank-one UE-RS sequences may already be allocated to macro eNB 14 and RRH A. In some embodiments, to account for the shortage of UE-RS sequences within cell 12, UE-RS sequences may be reused within cell 12 and/or more UE-RS sequences may be defined for the cell 12.

For example, a UE-RS may be generated, e.g., by an access node such as macro eNB 14, using a parameter specific to a UE device such as any of UE devices 18. The UE-RS may be received and used by a UE device 18 to facilitate demodulation of multiple-input, multiple-output ("MIMO") communications.

In various embodiments, a pseudo-random sequence generator of an access node such as macro eNB 14 that generates the UE-RS may be initialized ($C_{init}$), e.g., at the start of each LTE subframe, using the following equation:

$$c_{init}=(\lfloor n_s/2 \rfloor+1) \times (2N_{ID}^{cell}+1) \times 2^{16} + n_{SCID}$$ Equation 1:

The parameter specific to the UE device may include one or more of the parameters of Equation 1. In various embodiments, $n_s$ may be a slot number in a radio frame. $N_{ID}^{cell}$ may be a physical cell layer identity. $n_{SCID}$ may be a SCID.

Figure 2:
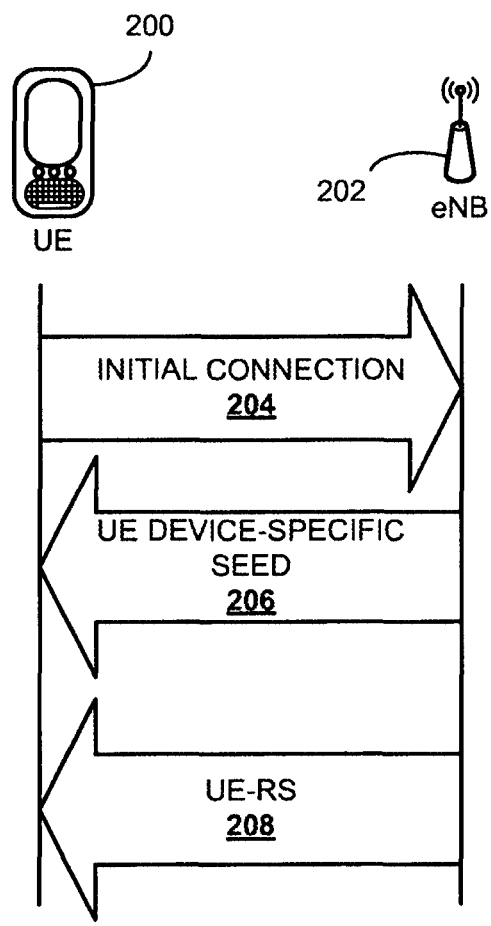
FIG. 2 schematically depicts transmission of a parameter used for generation of reference signals, in accordance with various embodiments.

In various embodiments, the parameter may be provided to UE device 18 by an access node such as macro eNB 14. Referring to FIG. 2, a UE device 200 and eNB 202 may initiate a wireless network connection at 204. At 206, eNB 202 may transmit, to UE device 200, a parameter, e.g., of Equation 1, using, e.g., radio resource control ("RRC") signaling. At 208, eNB device 202 may transmit a UE-RS, generated by UE device 200 using the parameter, to eNB 202. UE device 200 may be able to identify the UE-RS using the parameter it received at 206. Based on the UE-RS, the UE device may demodulate MIMO transmissions. By transmitting the parameter from eNB device 202 to UE device 200, it may be possible to reuse and/or define more UE-RS sequences within a single cell.

One way to transmit the parameter is to add a signaling bit to an existing communication. For example, an access node such as macro eNB 14 in FIG. 1 may transmit the parameter to a UE device 18 using downlink control information ("DCI"). The DCI may be in an extension of format 2C as defined in the LTE standard, or new format 2D, and may include three or more bits, such as four bits. This may enable signaling of SCIDs in format 2D, and additional SCID signaling (e.g., adding SCIDs 2 and 3) in format 2C.

The additional bit may also be used to indicate UE-RS antenna ports for MIMO communications of various ranks. For example, in rank-one and rank-two MIMO DCI communications, UE-RS antenna ports 11 and 13 may be indicated in conjunction with SCID 0 or 1. This may enable UE devices to transmit orthogonal UE-RS sequences when a composite rank of the UE devices is four.

Thus, in various embodiments, a DCI communication may be capable of indicating a SCID of 0, 1, 2 or 3. In various embodiments, the DCI additionally or alternatively may be capable of indicating UE-RS ports 11 or 13 while also indicating a SCID of 0 or 1. In some embodiments, a signaling bit may be added to format 2C DCI communications that may enable indication of either.

Another way to transmit the parameter is to include the parameter as part of a multi-bit channel state information-reference signal ("CSI-RS"), where the parameter is a value, $CSI-RS_{ID}$. In various embodiments, a pseudo-random sequence generator of an access node that generates the UE-RS may be initialized ($c_{init}$), e.g., at the start of each LTE subframe, using the following equation:

$$c_{init}=(\lfloor n_s/2 \rfloor+1) \times (2N_{ID}^{cell}+1) \times 2^{16} + CSI\text{-}RS_{ID} \times 2^8 + n_{SCID}$$ Equation 2:

This is similar to Equation 1, except for the addition of $CSI\text{-}RS_{ID} \times 2^8$. $CSI\text{-}RS_{ID}$ may include two bits that may be transmitted by an access node to a UE device in a DCI communication. More or less bits may be possible. In various embodiments, $CSI\text{-}RS_{ID}$ may function as a sub-cell identifier.

Referring back to FIG. 1, in various embodiments, UE devices 18 operating in cell 12 may utilize channels with selective, as opposed to flat, frequencies. Mitigating interference between UE devices operating on subcarriers within a selective channel may be difficult because a transmission covariance matrix of the channel may not be usable to approximate a channel covariance matrix of a subcarrier of the channel.

Accordingly, a UE device 18 may include a control module that may be configured to store, in memory of the UE device 18; priority rules. UE device 18 may determine a UE-RS resource allocated to another UE device within the same cell 12 based on a UE-RS resource allocated to the UE device 18 and the priority rules.

For example, macro eNB 14 may be configured to allocate rank-one UE-RS resources to UE devices 18 based on an ordered list of UE-RS resource identifier tuples {UE-RS antenna port, SCID}, such as the following: (7,0)>(8, 0)>(7, 1)>(8, 1). Thus, if a UE device 18 such as UE B is allocated UE-RS port 8 and SCID 0, UE B may assume that at least some UE-RS resources are allocated to another UE device 18 (e.g., UE A or UE C). For example, UE B may assume that UE-RS antenna port 7 and SCID 0 are allocated to UE A or UE C.

As another example, the following ordered list may be used by an eNB such as macro eNB 14 to allocate rank-two UE-RS resources: (7, 8, 0)>(7, 8, 1). The first two digits may be UE-RS antenna ports and the last digit may be a SCID, although the order may be changed. If a UE device 18 such as UE B is allocated UE-RS ports 7 and 8 and SCID 1, UE B may assume that at least some UE-RS resources are allocated to another UE device 18 (e.g., UE A or UE C). For example, UE B may assume that the combination of either UE-RS antenna port 7 and SCID 0 or antenna port 8 and SCID 0, or both, are allocated to UE A or UE C.

Depending on which UE-RS resources are allocated to UE device 18, and more particularly, where the allocated UE-RS resources exist in priority rules, UE device 18 may or may not be able to assume UE-RS resources are allocated to other UE devices in a cell. In situations where UE device 18 is unable to make the assumption, downlink signaling may be used in lieu of or in addition to priority rules-based assumptions.

For instance, in the above example, the UE-RS identifier tuple (7, 0) is the first to be allocated. If a UE device 18 such as UE B is allocated UE-RS port 7 and SCID 0, that UE device may not be able to assume that other UE-RS resources that may be allocated subsequent to (7, 0), such as (8, 0), are allocated to other UE devices in a cell. In such a situation, an access node such as macro eNB 14 may utilize downlink signaling to indicate to UE B whether UE-RS antenna port 8 and SCID 0 are allocated.

Figure 3:
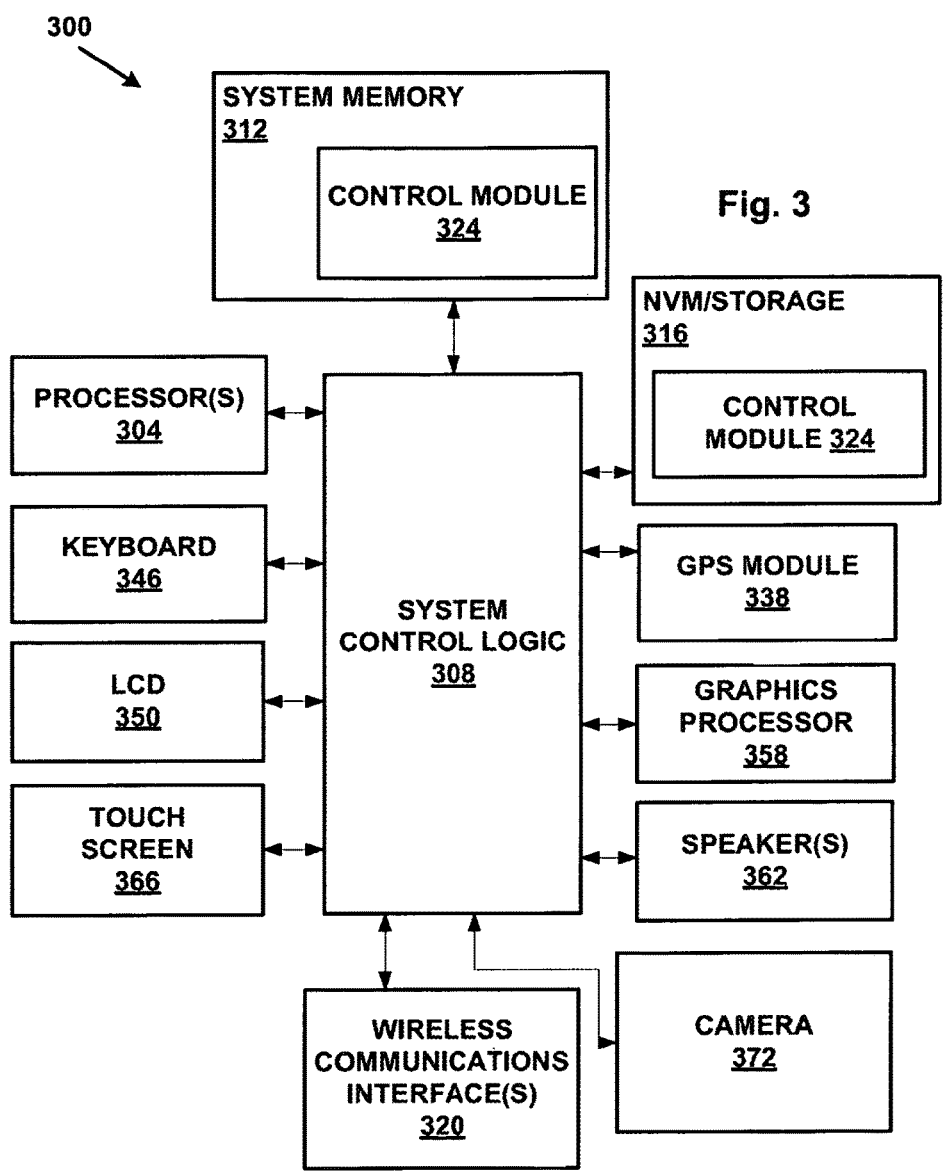
FIG. 3 schematically depicts an example system, in accordance with various embodiments.

The techniques and apparatuses described herein may be implemented into a system using suitable hardware and/or software to configure as desired. FIG. 3 illustrates, for one embodiment, an example wireless communication device in the form of a system 300 comprising one or more processor(s) 304, system control logic 308 coupled to at least one of the processor(s) 304, system memory 312 coupled to system control logic 308, non-volatile memory (NVM)/storage 316 coupled to system control logic 308, and one or more wireless communications interface(s) 320 coupled to system control logic 308.

System control logic 308 for one embodiment may include any suitable interface controllers to provide for any suitable interface to at least one of the processor(s) 304 and/or to any suitable device or component in communication with system control logic 308.

System control logic 308 for one embodiment may include one or more memory controller(s) to provide an interface to system memory 312. System memory 312 may be used to load and store data and/or instructions, for example, for system 300. System memory 312 for one embodiment may include any suitable volatile memory, such as suitable dynamic random access memory ("DRAM"), for example.

System control logic 308 for one embodiment may include one or more input/output ("I/O") controller(s) to provide an interface to NVM/storage 316 and wireless communications interface(s) 320.

NVM/storage 316 may be used to store data and/or instructions, for example. NVM/storage 316 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s) for example.

The NVM/storage 316 may include a storage resource physically part of a device on which the system 300 is installed or it may be accessible by, but not necessarily a part of, the device. For example, the NVM/storage 316 may be accessed over a network via the wireless communications interface(s) 320.

System memory 312 and NVM/storage 316 may include, in particular, temporal and persistent copies of control module 324, respectively. The control module 324 may include instructions that when executed by at least one of the processor(s) 304 result in the system 300 generating reference signals (e.g., UE-RS or UE-RS) with a parameter, transmitting that parameter and/or utilizing UE-RS priority rules, as described above. In some embodiments, the control module 324 may additionally/alternatively be located in the system control logic 308.

Wireless communications interface(s) 320 may provide an interface for system 300 to communicate over one or more network(s) and/or with any other suitable device. Wireless communications interface(s) 320 may include any suitable hardware and/or firmware, such as a wireless network adapter. The wireless communications interface(s) 320 may use one or more antenna(s).

For one embodiment, at least one of the processor(s) 304 may be packaged together with logic for one or more controller(s) of system control logic 308. For one embodiment, at least one of the processor(s) 304 may be packaged together with logic for one or more controllers of system control logic 308 to form a System in Package ("SiP"). For one embodiment, at least one of the processor(s) 304 may be integrated on the same die with logic for one or more controller(s) of system control logic 308. For one embodiment, at least one of the processor(s) 304 may be integrated on the same die with logic for one or more controller(s) of system control logic 308 to form a System on Chip ("SoC").

The system 300 may be a desktop or laptop computer, a base station, an eNB, a mobile telephone, a smart phone, a tablet, a set top box, a game console, or any other device adapted to transmit or receive a wireless communication signal. In various embodiments, system 300 may have more or less components, and/or different architectures. For example, in FIG. 5, system 300 includes a global positioning system ("GPS") module 338, a keyboard 346, a liquid crystal display ("LCD") screen 350 determine a location of system 300, a graphics processor 358, speakers 362, a touch screen 366 (which in some cases may be the same as LCD display 350), and a camera 372 that may be operated by the processor to capture images for storage in NVM/storage 316.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An evolved Node B ("eNB") comprising:
   a processor;
   memory coupled to the processor; and
   a control module to be operated by the processor and configured to transmit to a user equipment ("UE") device, through downlink control information ("DCI"), an indication of a reference signal ("RS") parameter value and a scrambling identity value that are to be used in conjunction with a physical cell layer identity, by the eNB, to determine an initialization value, Cinit, to generate a user equipment-specific reference signal ("UE-RS") to be sent to the UE device, and the RS parameter value and the scrambling identity value are usable by the UE device to identify the UE-RS to facilitate demodulation by the UE device of multiple-input, multiple-output communications,
   wherein the RS parameter value is a sub-cell identifier that is different from the physical cell layer identity and the scrambling identity value is determined by a single bit in the DCI.

2. The eNB of claim 1, wherein the DCI is in an extended format of DCI 2C or is a format DCI 2D, and includes more than 3 bits to indicate the parameter.

3. The eNB of claim 2, wherein the DCI is capable of indicating UE-RS ports 11 or 13 while also indicating a scrambling code identity ("SCID") of 0 or 1.

4. The eNB of claim 1, wherein the RS parameter value is included as a multi-bit channel state information-reference signal ("CSI-RS").

5. The eNB of claim 1, wherein the initialization value, $c_{init}$, that is used by the eNB to generate the UE-RS is initialized using the following equation:

$$c_{init}=(\lfloor n_s/2 \rfloor+1)\times(2N_{ID}^{cell}+1)\times2^{16}+\text{CSI-RS}_{ID}\times2^{8}+n_{SCID}$$

wherein $\text{CSI-RS}_{ID}$ is the RS parameter value, $n_s$ is a slot number in a radio frame, $N_{ID}^{cell}$ is a physical cell layer identity, and $n_{SCID}$ is the scrambling identity value.

6. The eNB of claim 1, further comprising a wireless communication interface.

7. A computer-implemented method, comprising:
generating, by an evolved Node B ("eNB"), a user equipment-specific reference signal ("UE-RS") based on an initialization value, Cinit, determined using a reference signal ("RS") parameter value, a physical cell layer identity, and a scrambling code identity, wherein the UE-RS is usable by a UE device to facilitate demodulation by the UE device of multiple-input, multiple-output communications;
transmitting, by the eNB, an indication of the RS parameter value and the scrambling code identity to the UE device, over a wireless communication interface, using downlink control information ("DCI"),
wherein the RS parameter value is a sub-cell identifier that is different from the physical cell layer identity and the scrambling code identity is determined by a single bit in the DCI; and transmitting the UE-RS.

8. The method of claim 7, wherein the DCI is an extension of DCI format 2C or is a DCI format 2D and includes more than 3 bits.

9. The method of claim 8, wherein the DCI is capable of indicating UE-RS ports 11 or 13 while also indicating a scrambling code identity ("SCID") of 0 or 1.

10. The method of claim 7, wherein transmitting the RS parameter value to the UE device comprises transmitting the RS parameter value as a multi-bit channel state information-reference signal ("CSI-RS").

11. The method of claim 7, further comprising initializing a pseudo-random sequence generator using the following equation:

$$(\lfloor n_s/2 \rfloor+1)\times(2N_{ID}^{cell}+1)\times2^{16}+\text{CSI-RS}_{ID}\times2^{8}+n_{SCID}$$

wherein ns is a slot number in a radio frame, $N^{cell}_{ID}$ is a physical cell layer identity and $n_{SCID}$ is the scrambling code identity, and $\text{CSI-RS}_{ID}$ is the RS parameter value.

12. The eNB of claim 1, wherein the memory comprises dynamic random access memory ("DRAM") that stores instructions to implement the control module.

* * * * *